United States Patent
Ghosh (10) Patent No.: US 9,859,453 B2
(45) Date of Patent: Jan. 2, 2018

(54) DUAL MODE III-V SUPERLATTICE AVALANCHE PHOTODIODE

(71) Applicant: Raytheon Company, Waltham, MA (US)

(72) Inventor: Siddhartha Ghosh, Woodland Hills, CA (US)

(73) Assignee: RAYTHEON COMPANY, Waltham, MA (US)

(*) Notice: Subject to any disclaimer, the term of this patent is extended or adjusted under 35 U.S.C. 154(b) by 0 days.

(21) Appl. No.: 14/792,962

(22) Filed: Jul. 7, 2015

(65) Prior Publication Data

US 2017/0012162 A1    Jan. 12, 2017

(51) Int. Cl.
*H01L 31/107*  (2006.01)
*H01L 31/0304*  (2006.01)
*H01L 31/0352*  (2006.01)
*G06F 17/50*  (2006.01)

(52) U.S. Cl.
CPC ...... *H01L 31/1075* (2013.01); *G06F 17/5022* (2013.01); *H01L 31/0304* (2013.01); *H01L 31/03046* (2013.01); *H01L 31/035236* (2013.01); *G06F 2217/02* (2013.01)

(58) Field of Classification Search
CPC ............. H01L 31/107; H01L 31/1075; H01L 31/0304; H01L 31/03046; H01L 31/035236; H01L 29/66113; H01L 31/184; H01L 31/1844
See application file for complete search history.

(56) References Cited

U.S. PATENT DOCUMENTS

| | | | | |
|---|---|---|---|---|
| 4,942,436 A | * | 7/1990 | Vetterling | B82Y 20/00 257/13 |
| 7,161,170 B1 | * | 1/2007 | Yoder | H01L 31/035236 257/21 |
| 7,282,777 B1 | * | 10/2007 | Chuang | B82Y 20/00 257/431 |
| 9,274,203 B1 | * | 3/2016 | Yap | G01S 3/783 |
| 2011/0240865 A1 | * | 10/2011 | Frach | G01T 1/2018 250/362 |
| 2012/0044964 A1 | * | 2/2012 | Yang | B82Y 20/00 372/45.01 |

(Continued)

OTHER PUBLICATIONS

Huang et al., "Dual-carrier High Gain Low-Noise Superlattice Avalanche Photodiodes" IEEE Transactions on Electronic devices, vol. 60 No. 7 Jul. 2013.*

(Continued)

*Primary Examiner* — Tom Thomas
*Assistant Examiner* — John Bodnar
(74) *Attorney, Agent, or Firm* — Daly, Crowley Mofford & Durkee, LLP (57) ABSTRACT

In one aspect, an avalanche photodiode, includes an absorber, a first superlattice structure directly connected to the absorber and configured to multiply holes and a second superlattice structure directly connected to the first superlattice structure and configured to multiply electrons. The first and second superlattice structures include III-V semiconductor material. The avalanche photodiode is a dual mode device configured to operate in either a linear mode or a Geiger mode. In another aspect, a method includes fabricating the avalanche diode.

13 Claims, 6 Drawing Sheets

(56) References Cited

U.S. PATENT DOCUMENTS

| | | | | |
|---|---|---|---|---|
| 2012/0051383 A1* | 3/2012 | Stern | ...................... | B82Y 20/00 372/50.21 |
| 2012/0199185 A1* | 8/2012 | Yang | ............... | H01L 31/035236 136/255 |
| 2012/0217475 A1* | 8/2012 | Leavitt | ................... | B82Y 20/00 257/14 |
| 2014/0239312 A1* | 8/2014 | Shatalov | ................. | H01L 33/32 257/76 |

OTHER PUBLICATIONS

Huang et al. ,"Dual-carrier High Gain Low-Noise Superlattice Avalanche Photodiodes" IEEE Transactions on Electronic devices, vol. 60 No. 7 Jul. 2013.*
PCT International Search Report and Written Opinion dated Jun. 1, 2016 for International Application No. PCT/US2016/020360; 12 Pages.
Mallick et al., "Midwavelength Infrared Avalanche Photodiode Using InAs—GaSb Strain Layer Superlattice;" Proceedings of the IEEE Photonics Technology Letters, vol. 19, No. 22; Nov. 15, 2007; 3 Pages.
Mallick et al., "Ultralow Noise Midwave Infrared InAs—GaSb Strain Layer Superlattice Avalanche Photodiode;" Applied Physics Letters vol. 91, 241111; Dec. 14, 2007; 3 Pages.
Huang et al., "Dual-Carrier High-Gain Low-Noise Superlattice Avalanche Photodiodes;" Proceedings of the IEEE Transactions on Electron Devices, vol. 60, No. 7; Jul. 2013; 6 Pages.
Banerjee et al., "Midwave Infrared InAs/GaSb Strained Layer Superlattice Hole Avalanche Photodiode;" Applied Physics Letters vol. 94, 201107; May 20, 2009; 3 Pages.

* cited by examiner

DUAL MODE III-V SUPERLATTICE AVALANCHE PHOTODIODE

BACKGROUND

A superlattice is a periodic structure of layers of at least two materials. In some examples, a layer is several nanometers thick. In some examples, a layer is a semiconductor material. In one particular example, a layer is a group III-V semiconductor material.

SUMMARY

In one aspect, an avalanche photodiode, includes an absorber, a first superlattice structure directly connected to the absorber and configured to multiply holes and a second superlattice structure directly connected to the first superlattice structure and configured to multiply electrons. The first and second superlattice structures include III-V semiconductor material. The avalanche photodiode is a dual mode device configured to operate in either a linear mode or a Geiger mode.

In another aspect, a method includes performing k·p simulations to establish bandgap and electronic band structure on a proposed configuration of the avalanche photodiode; performing Monte-Carlo simulations on the proposed configuration of the avalanche photodiode if the band-offsets are conducive for carrier transport; and determining layer thicknesses and doping levels of the avalanche photodiode. The avalanche photodiode includes an absorber; a first superlattice structure directly connected to the absorber and configured to multiply holes and a second superlattice structure directly connected to the first superlattice structure and configured to multiply electrons. The first and second superlattice structures include III-V semiconductor material. The avalanche photodiode is a dual mode device configured to operate in either a linear mode or a Geiger mode.

DETAILED DESCRIPTION

Described herein are techniques to fabricate an avalanche photodiode using superlattice structures that enable the avalanche photodiode to be a dual mode device (i.e., the avalanche photodiode may be operated in either a linear mode or a Geiger mode).

Figure 1:
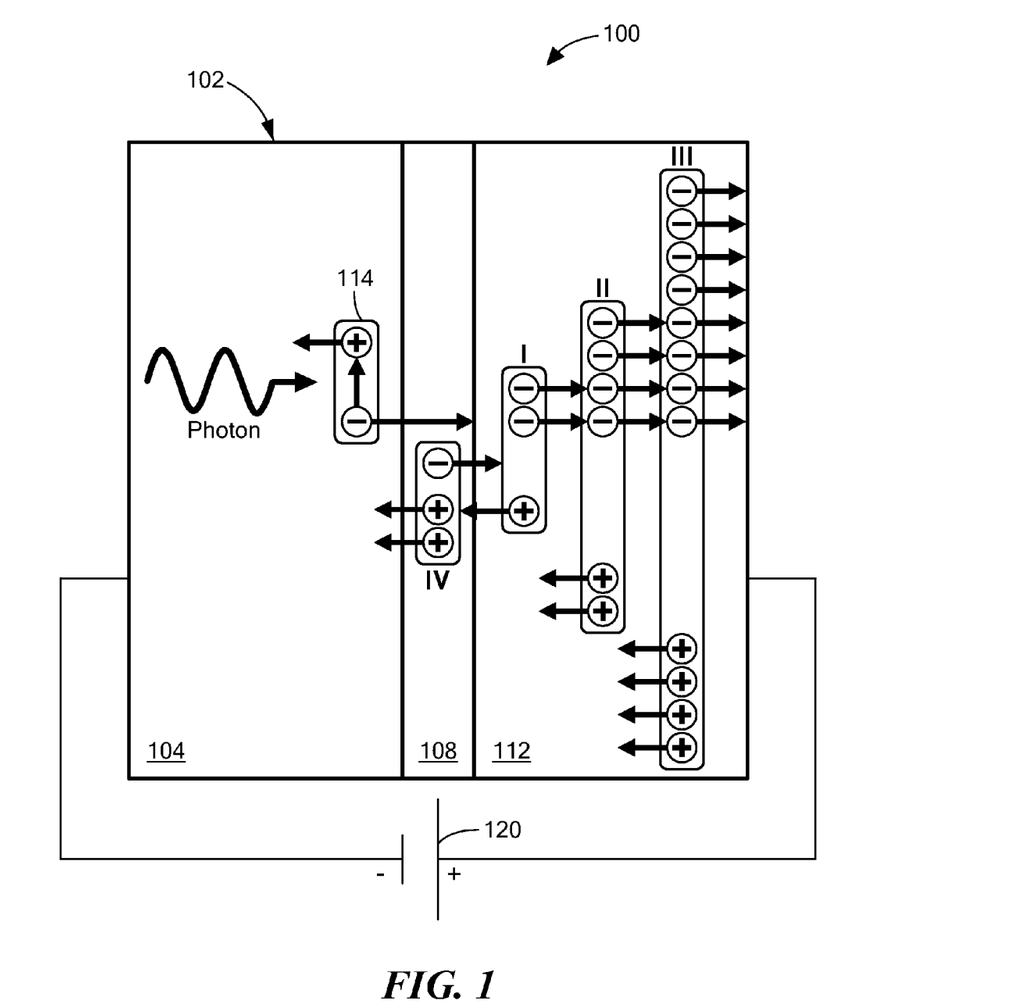
FIG. 1 is a diagram of an example of a dual mode superlattice avalanche photodiode.

Referring to FIG. 1, a circuit 100 includes an avalanche photodiode 102. The avalanche photodiode (APD) 102 includes an absorber 104, a first superlattice structure 108 and a second superlattice structure 112. In some examples, the first and second superlattice structures 108, 112 are each a type II strain layer superlattice (SLS). In one particular example, the absorber 104 is a p-type absorber graded for efficient carrier injection. The absorber 104 is configured to absorb photons at a desired wavelength (e.g., a laser wavelength used in an active imaging or ranging system).

When biased by a source 120 (e.g., a DC power source), the absorber 104 receives a photon to generate electron hole pairs (e.g., electron hole pair 114). The first superlattice structure 108 is configured to multiply holes and the second superlattice structure 112 is configured to multiply electrons. For example, when an electron from the electron hole pair 114 is received in the second superlattice structure 112, the electron is multiplied (see stage I) to form two electrons in total. At second stage II, the two electrons are multiplied to become four electrons and at stage III the four electrons are multiplied to become eight electrons. When a hole is received by the first superlattice structure 108 from the second superlattice structure 112, the hole is multiplied to become two holes in stage IV.

In one particular example, the first superlattice structure 108 and the second superlattice structure 112 are each noiseless. That is, the first superlattice structure 108 only multiplies holes (not electrons) and the second superlattice structure 112 only multiplies electrons (not holes).

The first superlattice structure 108 comprises III-V semiconductor material. In one example, the first superlattice structure 108 includes a layer of indium arsenide (InAs), a layer of indium gallium antimonide (InGaSb), a layer of aluminium antimonide (AlSb) and a layer of gallium antimonide (GaSb), which are repeated through the first superlattice structure 108. Each layer of indium arsenide (InAs) is about 0.8 nanometers thick, each layer of indium gallium antimonide (InGaSb) is about 1.9 nanometers thick, each layer of aluminium antimonide (AlSb) is about 0.3 nanometers thick and each layer of gallium antimonide (GaSb) is about 0.1 nanometers thick. The first superlattice structure 108 is about two thousand Angstroms thick.

The second superlattice structure 108 comprises III-V semiconductor material. In one example, the second superlattice structure 112 includes a layer of indium arsenide (InAs), a layer of aluminum gallium antimonide (AlGaSb), and a layer of gallium antimonide (GaSb), which are repeated through the second superlattice structure 112. Each layer of indium arsenide (InAs) is about 1.5 nanometers thick, each layer of aluminum gallium antimonide (AlGaSb) is about 3.8 nanometers thick and each layer of gallium antimonide (GaSb) is about 0.9 nanometers thick. The second superlattice structure 112 is about 1500 Angstroms thick.

Figure 2:
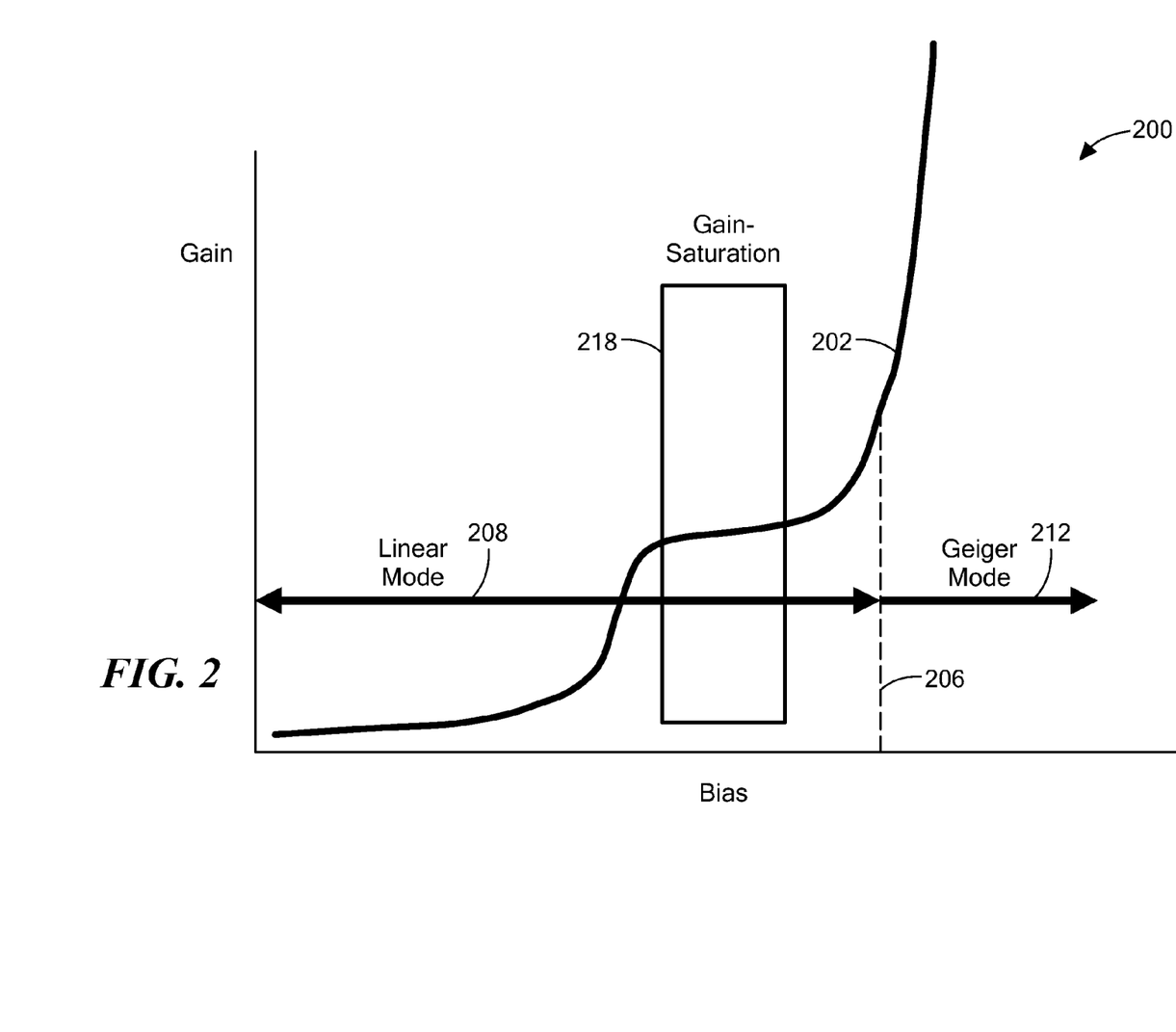
FIG. 2 is a graph of an example of a gain versus bias curve of the dual mode superlattice avalanche photodiode of FIG. 1.

Referring to FIG. 2, a graph 200 depicts a curve 202 of the gain versus bias relationship of the avalanche photodiode 102. Separate minibands within the conduction and valence bands in the avalanche photodiode allow for decreased impact ionization rates in certain energy bands as depicted in the curve 102. Thus, the avalanche photodiode 102 can operate in either a linear mode 208 or a Geiger mode 212. In the linear mode 208, as the bias over the avalanche photodiode 112 is increased from zero, the avalanche photodiode 112 reaches a gain saturation region 218, where the gain is relatively constant. With continued increased bias, the avalanche photodiode 112 reaches avalanche breakdown 206, which starts the Geiger mode 212. In the Geiger mode 212 there is a sharp rise in the gain with increased gain.

Figure 3:
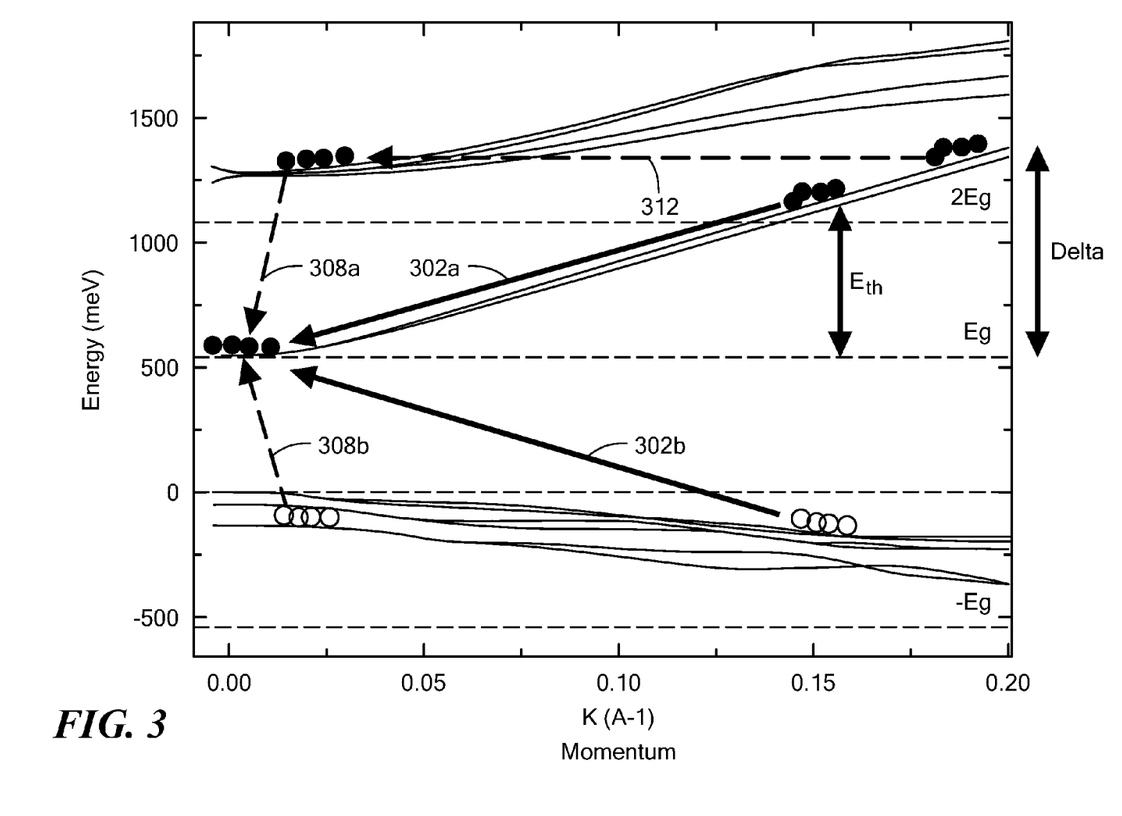
FIG. 3 is a graph of an example of an electron multiplication superlattice structure bandstructure.
Figure 4:
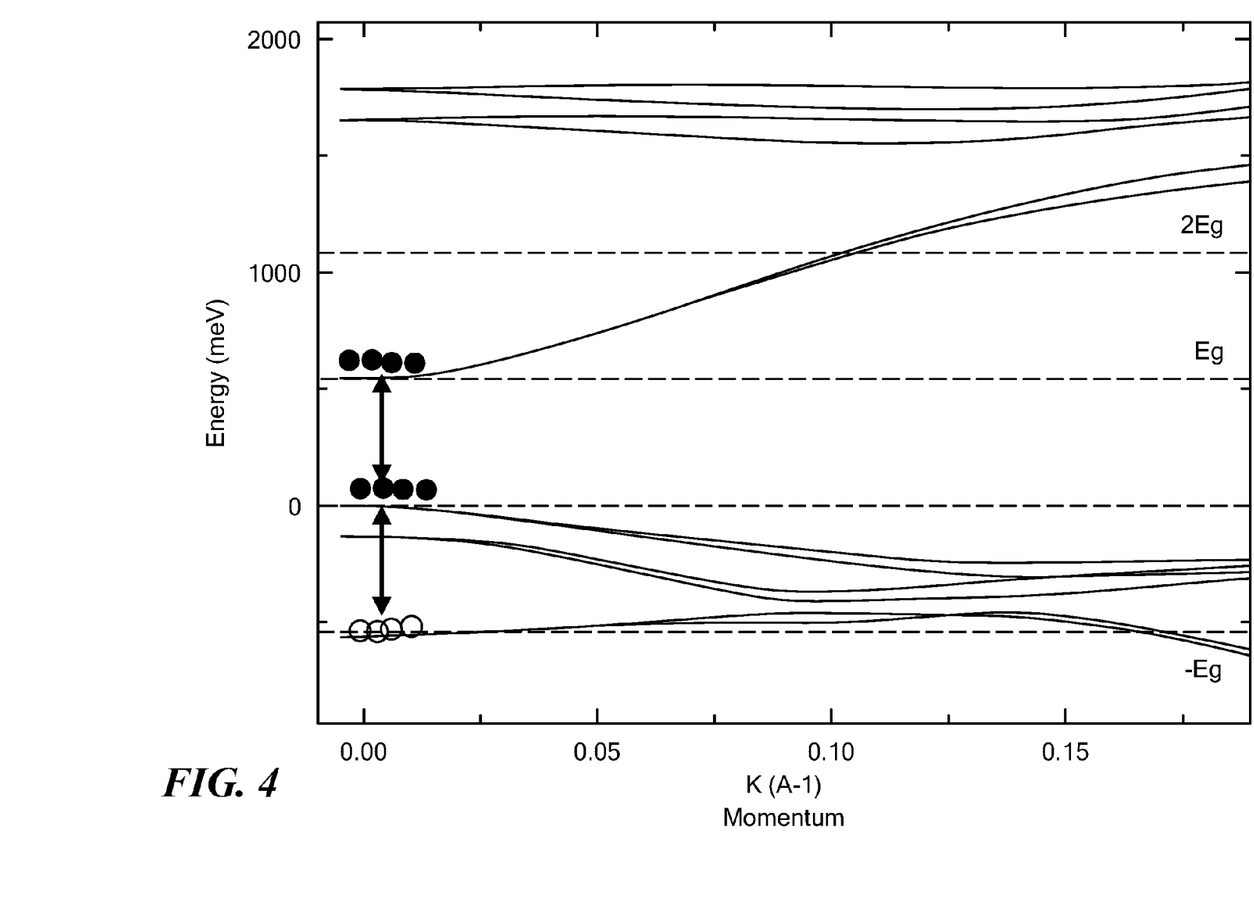
FIG. 4 is a graph of an example of a hole multiplication superlattice structure bandstructure.

FIGS. 3 and 4 are examples of bandstructures for electron multiplication and hole multiplication, respectively that are configured to enable the avalanche photodiode 102 to be able to function in either the Geiger mode or the linear mode depending on bias. In FIGS. 3 and 4, the black circles represent electrons while the white circles represent holes.

FIG. 3 is a graph of an example of an electron multiplication superlattice structure bandstructure of the second superlattice structure 112. The second superlattice structure 112 is configured to generate a Eg<Delta resonance in the conduction band. As the reverse bias across the avalanche photodiode 102 is increased, photoelectrons, generated in the absorber 104 via photon absorption, get injected into the second superlattice structure 112 and gain energy in conduction band 1 (CC1) and after gaining the threshold energy (Eth), the electrons (with finite momentum, k) start impact ionizing and generate electron-hole pairs. In the process, the electron loses energy and comes back to conduction band edge at the zone center (i.e., momentum (k)=0) (see arrows 302a, 302b). The impact ionization generated electrons and holes move in opposite directions and undergo impact ionization in their respective multiplication regions (electrons impact ionize only in the electron multiplication region (e.g., second superlattice structure 112) while holes only multiply in the hole multiplication region (e.g., first superlattice structure 108)). This process generates a positive feedback between the hole and electron multiplication regions. The gain in the avalanche photodiode 102 increases rapidly. If the gain is not stabilized, the avalanche photodiode 102 will exhibit runaway behavior. The electron initiated impact ionization becomes less and less efficient as the electron energy is increased beyond Eth. This is due to the strict energy and momentum conservation conditions required for impact ionization. The gain in the avalanche photodiode 102 increases but starts to saturate due to the inefficient impact ionization of electrons. This is the linear mode operation in the avalanche photodiode 102 and gain stabilization is implemented utilizing the gain saturation behavior. With proper electronic bandstructure configuration, the Eg<Delta resonance in the conduction band can be configured to occur at zone center. This configuration allows for carriers in CC1 (at or above Eth) to scatter to the zone center in conduction band 2 (CC2) as depicted by (see arrow 312). The scattered electrons at the zone center (k=0) in CC2 can very efficiently impact ionize due to relaxed momentum conservation conditions. The transition matrix elements at zone center are very strong and the impact ionization process at k=0 (see arrows 308a, 308b is very efficient. This leads to a rapid increase in the impact ionization rate for electrons and the gain in the avalanche photodiode 102 starts to increase rapidly again, which is the Geiger mode like behavior (depicted in FIG. 2) in the avalanche photodiode 102 implemented using electrons in CC2 zone center for impact ionization.

FIG. 4 is a graph of an example of a hole multiplication superlattice structure bandstructure.

Figure 5:
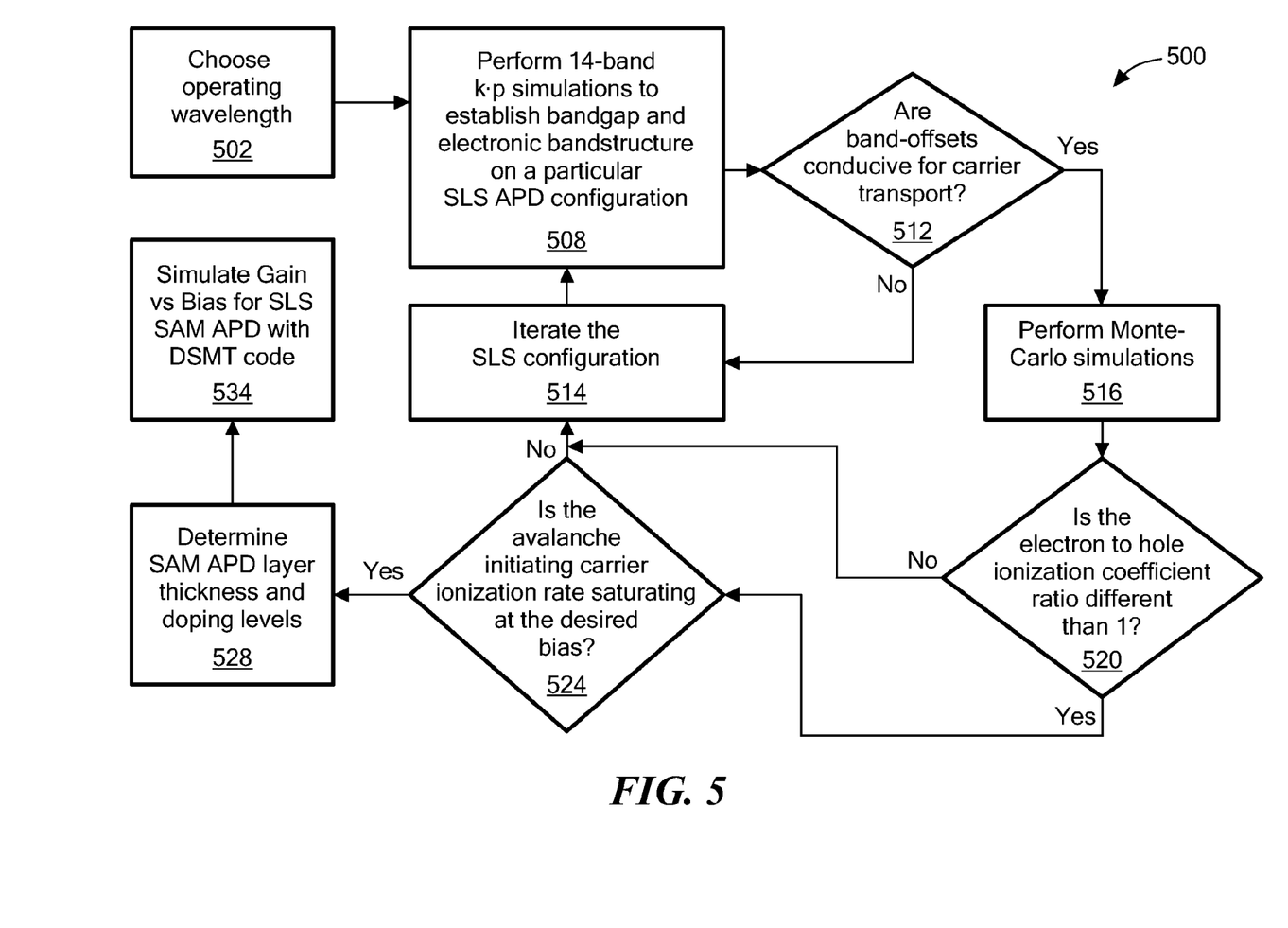
FIG. 5 is a flowchart of an example of a process to fabricate a dual mode III-V superlattice avalanche photodiode.

Referring to FIG. 5, a process 500 is an example of a process to fabricate a dual mode III-V superlattice avalanche photodiode (e.g., APD 102). The process 500 includes choosing an operating wavelength (502) and performing 14-band k·p simulations to establish a bandgap and electronic bandstructure on a particular superlattice structure (SLS) avalanche photodiode (APD) (508).

Process 500 determines whether the band-offsets are conducive for carrier transport (512). If the band-offsets are not conducive for carrier support, process 500 iterates the SLS configuration (514)

If the band-offsets are conducive for carrier support, Monte-Carlo simulations are performed (516). Process 500 determines if the electron-to-hole ionization coefficient ratio is different than 1 (530). If the electron-to-hole ionization coefficient ratio is 1, process 500 iterates the SLD configuration (514). If the electron-to-hole ionization coefficient ratio is different than 1, process 500 determines whether the avalanche initiating carrier ionization rate is saturating at the desired bias (524). If the avalanche initiating carrier ionization rate is not saturating at the desired bias, process 500 iterates the SLD configuration (514).

If the avalanche initiating carrier ionization rate is saturating at the desired bias, Process 500 determines separate adsorption and multiplication (SAM) APD layer thickness and doping levels (528) and simulates gain versus bias for SLS SAM APD with dead-space multiplication theory (DSMT) code (534).

Figure 6:
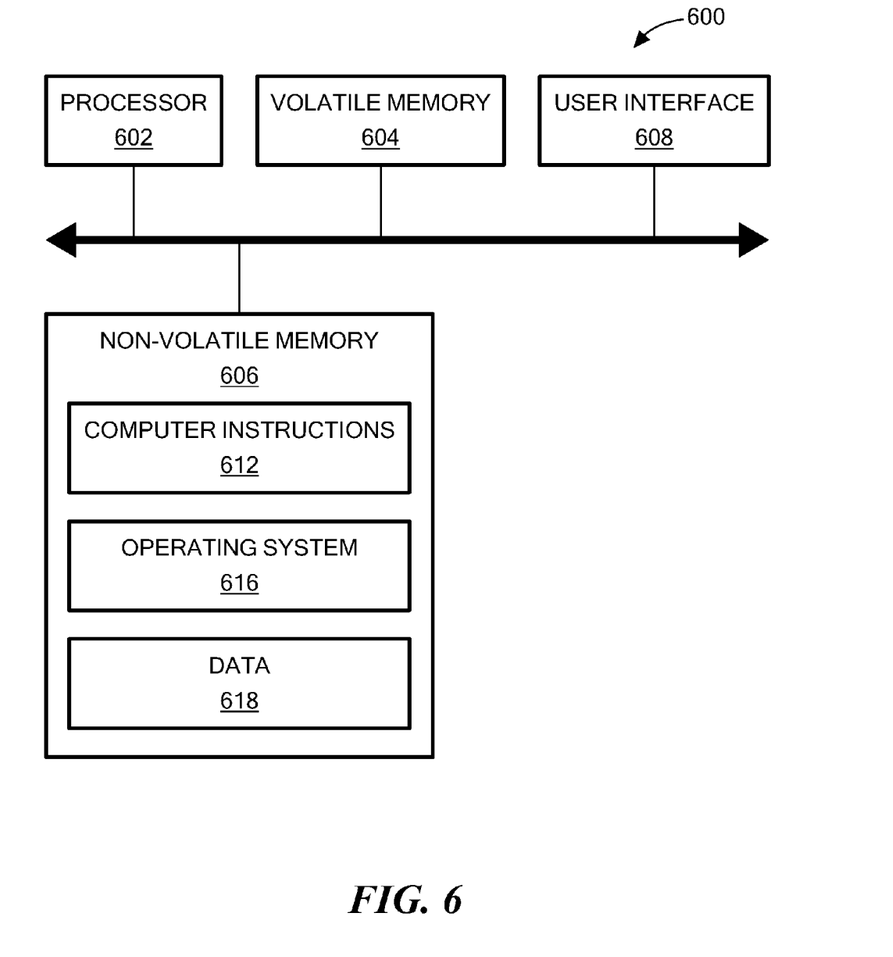
FIG. 6 is a computer on which any portion of the process of FIG. 5 may be implemented.

Referring to FIG. 6, in one example, a computer 600 includes a processor 602, a volatile memory 604, a non-volatile memory 606 (e.g., hard disk) and the user interface (UI) 608 (e.g., a graphical user interface, a mouse, a keyboard, a display, touch screen and so forth). The non-volatile memory 606 stores computer instructions 612, an operating system 616 and data 618. In one example, the computer instructions 612 are executed by the processor 602 out of volatile memory 604 to perform all or part of the processes described herein (e.g., process 500).

The processes described herein (e.g., process 500) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 500 is not limited to the specific processing order of FIG. 5. Rather, any of the processing blocks of FIG. 5 may be re-ordered, combined or removed, performed in parallel or in serial, as necessary, to achieve the results set forth above.

The processing blocks (for example, in the process 500) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. An avalanche photodiode, comprising:
an absorber;
a first superlattice structure directly connected to the absorber and configured to multiply holes, the first superlattice structure comprising III-V semiconductor material;
a second superlattice structure directly connected to the first superlattice structure and configured to multiply electrons, the second superlattice structure comprising III-V semiconductor material;
wherein the avalanche photodiode is a dual mode device configured to operate in either a linear mode or a Geiger mode,
wherein the first superlattice structure comprises:
layers of indium arsenide (InAs);
layers of indium gallium antimonide (InGaSb);
layers of aluminum antimonide (AlSb); and
layers of gallium antimonide (GaSb).

2. The avalanche photodiode of claim 1, wherein the first and second superlattice structures are each a type II strain layer superlattice.

3. The avalanche photodiode of claim 1, wherein the absorber is a p-type absorber.

4. The avalanche photodiode of claim 1, wherein each layer of indium arsenide (InAs) is about 0.8 nanometers thick, each layer of indium gallium antimonide (InGaSb) is about 1.9 nanometers thick, each layer of aluminium aluminum antimonide (AlSb) is about 0.3 nanometers thick and each layer of gallium antimonide (GaSb) is about 0.1 nanometers thick.

5. The avalanche photodiode of claim 4, wherein the first superlattice structure is about two thousand Angstroms thick.

6. The avalanche photodiode of claim 1, wherein the second superlattice structure comprises layers of indium arsenide (InAs), layers of aluminum gallium antimonide (AlGaSb), and layers of gallium antimonide (GaSb).

7. The avalanche photodiode of claim 6, wherein each layer of indium arsenide (InAs) is about 1.5 nanometers thick, each layer of aluminum gallium antimonide (AlGaSb) is about 3.8 nanometers thick and each layer of gallium antimonide (GaSb) is about 0.9 nanometers thick.

8. The avalanche photodiode of claim 7, wherein the second superlattice structure is about 1500 Angstroms thick.

9. An avalanche photodiode, comprising:
an absorber;
a first superlattice structure directly connected to the absorber and configured to multiply holes, the first superlattice structure comprising III-V semiconductor material;
a second superlattice structure directly connected to the first superlattice structure and configured to multiply electrons, the second superlattice structure comprising III-V semiconductor material, wherein the avalanche photodiode is a dual mode device configured to operate in either a linear mode or a Geiger mode,
wherein the first and second superlattice structures are each a type II strain layer superlattice,
wherein the absorber is a p-type absorber,
wherein the first superlattice structure comprises:
layers of indium arsenide (InAs);
layers of indium gallium antimonide (InGaSb);
layers of aluminum antimonide (AlSb); and
layers of gallium antimonide (GaSb), and
wherein the second superlattice structure comprises:
layers of indium arsenide (InAs);
layers of aluminum gallium antimonide (AlGaSb); and
layers of gallium antimonide (GaSb).

10. The avalanche photodiode of claim 9, wherein each layer of indium arsenide (InAs) is about 0.8 nanometers thick, each layer of indium gallium antimonide (InGaSb) is about 1.9 nanometers thick, each layer of aluminum antimonide (AlSb) is about 0.3 nanometers thick and each layer of gallium antimonide (GaSb) is about 0.1 nanometers thick.

11. The avalanche photodiode of claim 9, wherein the first superlattice structure is about two thousand Angstroms thick.

12. The avalanche photodiode of claim 9, wherein each layer of indium arsenide (InAs) is about 1.5 nanometers thick, each layer of aluminum gallium antimonide (AlGaSb) is about 3.8 nanometers thick and each layer of gallium antimonide (GaSb) is about 0.9 nanometers thick.

13. The avalanche photodiode of claim 9, wherein the second superlattice structure is about 1500 Angstroms thick.

* * * * *